Feb. 7, 1939. H. H. MOSS 2,146,266
METAL CUTTING PROCESS AND APPARATUS
Filed Sept. 26, 1935
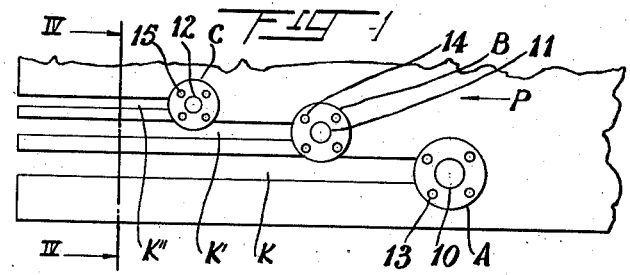
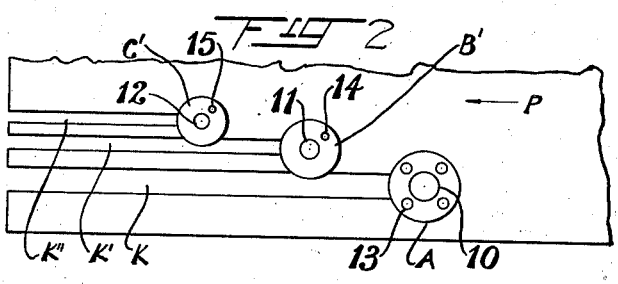
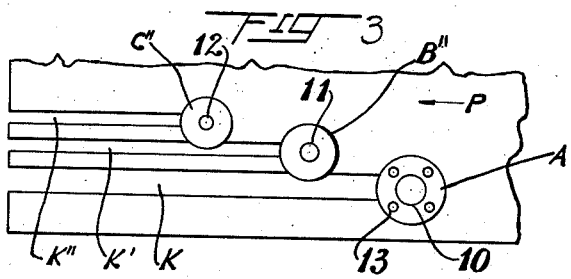
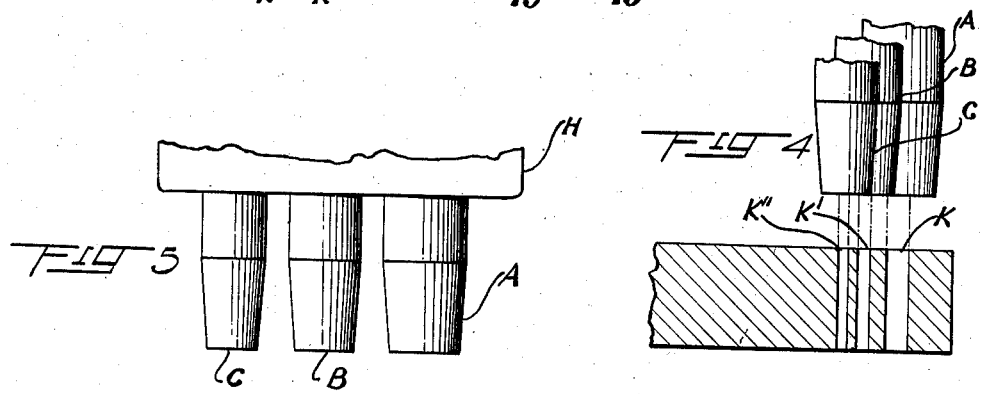
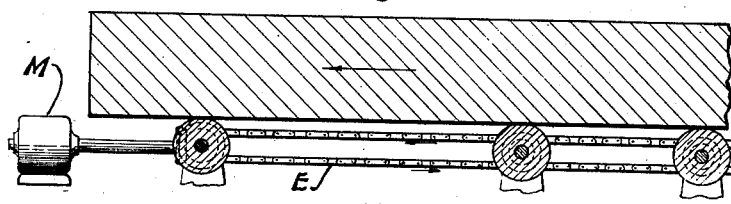
INVENTOR
HERBERT H. MOSS.
BY
Chas. C. Scheffler
ATTORNEY Patented Feb. 7, 1939

2,146,266

UNITED STATES PATENT OFFICE 2,146,266

METAL CUTTING PROCESS AND APPARATUS

Herbert H. Moss, Brooklyn, N. Y., assignor, by mesne assignments, to Union Carbide and Carbon Corporation, a corporation of New York Application September 26, 1935, Serial No. 42,213

12 Claims. (Cl. 148—9)

This invention relates to the art of cutting metals by means of gaseous heating and oxidizing jets.

In gas cutting certain so-called air-hardening grades of steel and those grades, such as the structural silicon steels, which harden perceptibly under the quenching following conventional gas cutting operations, the surface of the cut edge may become hard and brittle; and stresses, weaknesses, and microscopic cracks may develop therein which are very objectionable in the finished product. Before using these grades of steel when so cut, the heat-affected edges have been removed mechanically, as by machining off a layer of the cut surface; or the cut surfaces have been heat treated to eliminate the several possible detrimental effects of the cutting operation. These extra steps substantially retard fabrication of these steels and otherwise considerably increase fabricating costs. Even though the heat treatment is performed coincidently with the cutting operation, the speed of production is often reduced and additional quantities of fuel gas are required.

The principal objects of this invention are to provide a metal cutting process and apparatus which: (1) eliminates the necessity of machining a gas cut metal edge or special heat treatment of the same; (2) will permit the cutting operation to proceed at the normal cutting speed without excessive use of fuel gas; and (3) will improve the quality of the cut edge.

These and other objects and the novel features of the invention will become apparent from the following description and the accompanying drawing. In the drawing, Figs. 1, 2 and 3 are plan views diagrammatically illustrating arrangements of apparatus for performing processes embodying this invention;

Fig. 4 is a cross section taken on the line IV—IV of Fig. 1; and

Fig. 5 is a side view of gas cutting apparatus embodying this invention.

According to this invention, the hardening of the flame-cut surfaces of metals, particularly certain grades of moderate air-hardening steels and quench-hardening steels, is modified or prevented by the compounding of the cutting phenomenon, i. e., by simultaneously applying to, and advancing along, the metal to be cut two or more gaseous cutting jets in such a manner as to simultaneously produce separate gas cuts in such spaced proximity to each other that the several simultaneous cutting operations will cooperate to soak sufficient heat into the metal adjoining the cuts at predetermined time intervals to thereby prevent the cut surfaces, particularly the surface cut by the last oxidizing jet in the group, from becoming rapidly quenched by the surrounding atmosphere and/or by the chilling action of the adjoining main body of the metal being cut. Such cutting may be accomplished with relatively little fuel gas and economical overall oxygen consumption by employing appropriate or graded sizes or cross-sections of cutting oxygen jets and/or various cutting oxygen pressures adjusted to obtain maximum utilization of the heat produced by the several cutting jets. In certain operations, additional economy in gas consumption and greater speed may be attained by reducing the distances between the several cutting jets and by omitting some or all of the preheating jets associated with the cutting jets which follow the leading one.

Referring to Fig. 1 of the drawing, a cutting unit for accomplishing the objects of this invention may consist of two or more (three in the present example) nozzles A, B and C, of any suitable or preferred construction, fixed relatively to one another and severally provided with central orifices 10, 11 and 12 for delivering substantially parallel spaced jets of oxidizing gas such as cutting oxygen; and means, such as groups of smaller orifices 13, 14 and 15, around the central orifices to deliver jets of combustible or preheating gas such as a mixture of acetylene and oxygen. When cutting metal plate, for example, the passages in the nozzles are desirably so constructed that the several cutting oxygen jets delivered by the orifices 10, 11 and 12 will be parallel to one another and will impinge perpendicularly against the face of the plate so that the surface of each cut, and particularly that of the final cut, will be square with or perpendicular to both faces of the plate. However, if it is desired that the surface of the finished cut shall be beveled, all of the jets, or at least the final jet, should impinge angularly against the face of the plate, according to the bevel desired.

When cutting metal with the cutting unit of Fig. 1 it will be understood that the preheating jets or flame of the leading preheating oxidizing nozzle A will first preheat the metal P to a kindling temperature, and thereupon its cutting oxygen will be turned on to deliver a flame-cutting or oxidizing jet against the so preheated metal and by oxidation produce a kerf or a cut through the plate to produce further preheating of the metal in preparation for the final cut. Both the preheating flame and the exothermic heat of this oxidation soak considerable heat into the main body of metal. The preheating and cutting jets of the nozzles B and C will, of course, become operative when the preceding preheating and cutting jets have travelled along the plate the distances between the successive nozzles. The preheating and cutting jets of nozzle B and nozzle C soak considerable additional heat into the body of the plate, especially exothermic heat derived from the cutting of two additional kerfs in close proximity and substantially parallel to the kerf cut by nozzle A. Accordingly, after the final cut has been made by the cutting jet of nozzle C, the total quantity of heat within the body of the plate will be sufficient to prevent a rapid quenching of the freshly cut surface, and by varying the number and spacing of the auxiliary cutting nozzles A and B and the sizes and pressures of their oxidizing and preheat jets, the hardening of the cut surface can be entirely prevented or modified to any desired degree. For example, by appreciably spacing the respective jets so that moderate quantities of high temperature heat are successively applied and disseminated after relatively long time intervals, more efficient transfer of the soaking heat is obtained than when a single jet is used, because heat transfer is a function of the temperature gradient between the respective parts.

The relative movement of the cutting unit and the plate P or other metal to be cut is such that, during cutting, the planes of the several kerfs preferably will be substantially parallel; and, to minimize the amount of scrap metal produced, the cutting lines preferably should be no farther apart than is necessary to provide ample width of metal for the several kerfs produced by the cutting jets. The oxidizing jets of nozzles A and B are spaced slightly apart laterally outside of the line of cut formed by the nozzle C, to preheat the portions of the plate P within and adjoining the line of cut. To effect further economy both in gas consumption and in scrap metal, the diameters or cross-sectional sizes of the several cutting oxygen jets may be progressively smaller from the leading jet to the final one, and the sizes of the several preheating flames or groups of preheating jets may be correspondingly smaller, as indicated in Fig. 1. Also, the pressures or velocities of the several cutting jets and preheating jets may be progressively smaller or otherwise varied to suit requirements.

As illustrated in Fig. 1, the distance between the preheating oxidizing nozzles A and B (measured lengthwise of the cutting direction) may be such that the temperature of the metal cut by the nozzle A falls below the kindling temperature by the time the cutting jet of nozzle B is applied thereto; and, similarly, the interval between the application of the cutting jet of nozzle B and that of nozzle C may be so long that the metal falls below its kindling temperature by the time the cutting jet of nozzle C is applied thereto. Under these conditions it is necessary to supply additional preheat in conjunction with each cutting jet, as by means of preheating jets 14 and 15, to raise the metal to its kindling temperature at the time each cutting jet is applied. However, the amount of additional preheat needed in this procedure will be considerably less than would be required in producing a single cut in cold metal, because much of the heat developed and disseminated into the metal by preheating and cutting with nozzle A is still retained by the metal when the cutting jet of nozzle B is applied, so that the preheating flame associated with nozzle B needs only to be sufficient to supplement the relatively high temperature heat already in the metal and raise that point to the kindling temperature when the oxidizing jet of nozzle B is applied thereto. The preheating flame associated with the cutting oxygen jet of nozzle C similarly supplies supplemental heat and raises the metal to a kindling temperature by the time the cutting jet of nozzle C is applied to the metal. A substantial economy of gas consumption is thus afforded, and further economy may be obtained by positioning the several nozzles closer together, as illustrated in Figs. 2 and 3. In Fig. 2 the several nozzles are sufficiently close together to permit the elimination of some, but not all, of the preheat, since the nozzles are still so far apart that the metal falls slightly below its kindling temperature before the cutting jets of nozzles B' and C' are applied. In Fig. 3, on the other hand, the nozzle B'' is so located relatively to the nozzle A'', and the nozzle C'' is so located relatively to the nozzle B'' that the metal will still be at its kindling temperature when it reaches the cutting jet of nozzle B'' and also when it reaches the cutting jet of nozzle C'', thus entirely eliminating the need of supplemental preheat for the cutting jets of nozzles B'' and C''. The preheating and cutting jets of the several nozzles may be graded as to size, and the gases may be preheated to increase the economy, as by preheating the cutting oxygen supplied to the nozzles B'' and C''.

Clearly the nozzles A, B, and C may be spaced as desired, and the following nozzles, as the nozzles B and C, may be spaced to produce desired metallurgical qualities in the metal after cutting, including definite modifications in the grain structure of the cut edges. Thus the nozzles may be spaced to provide for predetermined cooling and reheating of the metal.

A typical apparatus for performing cutting operations according to this invention is illustrated in side elevation in Fig. 5. The several cutting nozzles A, B and C are secured to a suitable gas supply head H which may be carried by suitable mechanism (not shown) adapted to propel the head and nozzles along the metal to be cut; or, conversely, the head and nozzles may be held stationary on a support and the metal to be cut may be propelled relatively thereto as indicated by the arrows in Figs. 1, 2, 3, and 5. Under certain conditions, it will be desirable to propel the head H and under other conditions it will be desirable to propel the metal to be cut, relative movement between the metal and the jet projecting means being necessary in order to carry out the invention. As illustrated in Fig. 5, an endless conveyor E driven by a motor M serves to propel the metal beneath the head H.

The position of the cutting apparatus and the several kerfs K, K', K'' produced thereby are shown in end view in Fig. 4. These kerfs may be progressively narrower as shown, due to the progressively smaller sizes of the cutting oxygen jets delivered by the nozzles A, B and C, and if fins separate the respective kerfs they may be made progressively thinner by successively reducing the lateral distance between adjoining kerfs as the jets approach the final cutting jet.

From the foregoing, it will be apparent that the edges of metal cut in accordance with the present invention will not require machining or special heat treatment, because of the gradual cooling to which they have been subjected. It will be further evident that cutting operations performed in accordance with the invention may proceed at normal cutting speed and may be effected without excessive use of fuel gas. Finally, it will be recognized that the quality of the cut edge is necessarily improved when the cut is made as described above.

The specific methods and embodiments here described are presented merely as examples of how the invention may be applied. Other forms, differing in detail but not in principle from those here disclosed, will, of course, suggest themselves to those skilled in the art.

I claim:

1. In a process of flame-cutting metal wherein a flame-cutting jet is projected against successive portions of a body of ferrous metal, a method of counteracting the quench-hardening effects during cooling of said body from the flame-cutting operation, comprising projecting at least one oxidizing jet against successive portions of said body slightly offset laterally from and outside of the line of cut at a point sufficiently in advance of said flame-cutting jet that the exothermic heat of reaction from said oxidizing jet soaks into the adjoining portions sufficiently to counteract quench hardening.

2. Process as claimed in claim 1 wherein a plurality of substantially parallel oxidizing jets are employed, said jets being applied at successive distances in advance of said flame-cutting jet and at successive distances laterally outside of the line of cut, the lateral spacing of each oxidizing jet being substantially equal to the width of kerf formed by the respective jets.

3. A process of soaking heat into a metal body for a flame-cutting operation so as to counteract quench hardening of the body adjacent to the flame-cut edges, comprising progressively applying a series of preheating gaseous oxidizing jets to the successive portions of the body which are to be exposed to the action of the flame-cutting jet sufficiently in advance of the flame-cutting jet as to thoroughly soak heat into said portions prior to the flame-cutting operation; and disseminating the heat from each of said preheating oxidizing jets throughout the adjoining portions of the body until the temperature falls to below the kindling temperature before applying the next succeeding preheating oxidizing jet.

4. A process of flame-cutting ferrous metal and counteracting quench-hardening effects induced in the edges adjoining the cut by the flame-cutting operation, comprising simultaneously applying to and progressively along the metal at least one preheating jet of oxidizing gas, and a flame-cutting jet for severing the metal, the respective jets being substantially parallel and being spaced longitudinally with respect to the path of movement so that the heat from one jet soaks into the adjoining portions of metal before the succeeding jet is applied, to thereby counteract quench-hardening, such respective preheating jets of oxidizing gas being disposed laterally outside of the line of cut but no farther apart laterally than is necessary to provide ample width of metal for the several kerfs produced by the respective jets.

5. A process of flame-cutting a ferrous metal plate and of counteracting quench-hardening effects induced in the edges adjoining the cut by the flame-cutting operation, which comprises applying to and progressively along the metal at least two laterally and longitudinally spaced gaseous oxidizing jets, impinging perpendicularly against the face of the plate to form separate non-intersecting cuts perpendicular to the face of the plate; allowing the exothermic heat from the jets to soak into the adjoining portions of metal thereby preheating the same to counteract quenching; and concurrently with the preheating operations progressively applying a flame-severing jet along the successive preheated portions.

6. Process of cutting ferrous metal, which comprises producing at least two separate and successive non-intersecting gas cuts, to soak in successive stages sufficient heat into the main body of uncut metal adjacent the said cuts to prevent the rapid quenching of the freshly cut surfaces and the consequent hardening thereof, the gas cuts being formed by oxidizing jets of progressively lower capacity in the direction of the final cut.

7. Process of cutting ferrous metal, which comprises simultaneously applying to and progressively along the metal at least two laterally- and longitudinally-spaced gaseous oxidizing jets to produce separate substantially parallel cuts in such close proximity to one another that the total heat flowing from the leading jet or jets preheats the main body of metal adjacent the cutting zone to prevent a rapid quenching of the final gas-cut surface and undue hardening thereof, said oxidizing jets being of progressively smaller size in a direction away from the leading jet.

8. Process for cutting ferrous metal as claimed in claim 7, in which the lateral spacing of the oxidizing jets progressively decreases in a direction away from the leading jet.

9. Apparatus for cutting metal comprising a nozzle for projecting an oxidizing gas jet, a nozzle for projecting an oxidizing gas jet of smaller size parallel to the jet projected by said first-named nozzle and in close proximity thereto, and means for producing relative movement between the metal and said two nozzles to produce two separate gas cuts to thereby soak intense heat into the zone adjacent to the successive cut portions to retard cooling from the final cutting operation.

10. Apparatus for cutting metal comprising a gas supply head, and a plurality of nozzles fixed relatively to one another in said head, said nozzles being severally provided with central orifices for delivering parallel laterally and longitudinally spaced jets of oxidizing gas, means for providing relative movement between said head and the metal, said jets being spaced progressively closer laterally in the direction of the final cutting jet.

11. Process of cutting ferrous metal which comprises producing at least two separate and successive gas cuts with oxidizing jets, thereby soaking in successive stages sufficient heat into the main body of uncut metal adjacent to the cuts to prevent the rapid quenching of the freshly cut surfaces, the leading oxidizing jet having a gaseous preheating jet associated therewith which is of greater intensity than the preheating jets associated with the succeeding oxidizing jets.

12. Process of cutting ferrous metal, which comprises concurrently applying to and in parallel paths along the metal at least two separate successive jets of gaseous heating and oxidizing fluids, thereby producing separate laterally-spaced non-intersecting cuts in such close proximity to one another that the heat from said first jet conducted into the main body of metal adjacent the first cut is supplemented by sufficient heat developed by the next succeeding jet and conducted into the said main body of metal to prevent a rapid quenching of the final freshly cut surface and undue hardening of the metal adjacent the latter, the leading oxidizing jet alone having a gaseous heating jet associated therewith.

HERBERT H. MOSS.